(No Model.)

L. STRAUSS.
FASTENER FOR POCKET BOOKS, &c.

No. 247,223. Patented Sept. 20, 1881.

Witnesses:
A. M. Burnham
Daniel Breed

Inventor:
Leopold Strauss
by C. S. Whitman
Atty.

UNITED STATES PATENT OFFICE.

LEOPOLD STRAUSS, OF MIDDLETOWN, CONNECTICUT.

FASTENER FOR POCKET-BOOKS, &c.

SPECIFICATION forming part of Letters Patent No. 247,223, dated September 20, 1881.

Application filed April 9, 1881. (No model.)

*To all whom it may concern:*

Be it known that I, LEOPOLD STRAUSS, of the city of Middletown, county of Middlesex, and State of Connecticut, have invented and made a new and useful Fastener for Pocket-Books, Diaries, and the like; and I do declare the following to be a full, clear, and exact description thereof, reference being made to the accompanying drawings, which make a part of this my specification.

Figure 1:
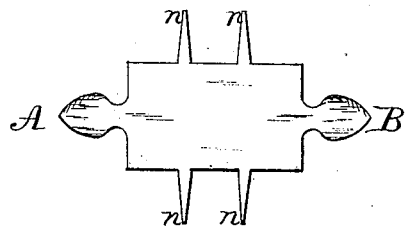

I take a plate of brass or other suitable metal of sufficient elasticity to form a spring, and I cut from it a piece of the shape represented in Figure 1. The projecting ends A and B are stamped so as to form a boss on the under side, giving each the form of a small spoon-bowl. The ends of the plate are then folded so as to produce a form of which a vertical section passing through A and B is represented in Fig. 2. The hollow sides of A and B, being thus made to face each other, form a hollow knob, resembling in outward appearance a split acorn, and can be pressed together by reason of the elasticity of the metal.

Figure 2:
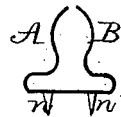

This fastener, so constructed, is attached to the body of the pocket-book or diary at the usual place of fastening by means of teeth-like points cut with the plate and bent down, as represented at *n* and *n* in Figs. 1 and 2.

Figure 3:

Fig. 3 is a sectional view, showing my fastener as applied for use.

In the flap or strap of the pocket-book or diary, at the point where it meets this fastener, I insert a metallic ring or eyelet, which readily slips over the spring-bosses of the fastener and holds, by the reaction of the springing metal, the pocket-book firmly closed and fastened.

What I claim, and desire to secure by Letters Patent of the United States, is as follows:

A fastener having the spoon shaped ends A and B and the teeth *n n* for attaching it to the article, all stamped or struck up in one piece and bent into form, as shown and described.

LEOPOLD STRAUSS.

Witnesses:
ABRAHAM PHILLIPS,
LOUIS STRAUSS.